United States Patent [19]

Taniguchi et al.

[11] Patent Number: 5,185,923
[45] Date of Patent: Feb. 16, 1993

[54] METHOD OF MAKING A FRICTIONALLY SLIDING COMPONENT

[75] Inventors: Masato Taniguchi; Haruyoshi Matsuura, both of Nagoya, Japan

[73] Assignee: NGK Spark Plug Co., Ltd., Nagoya, Japan

[21] Appl. No.: 744,686

[22] Filed: Aug. 9, 1991

Related U.S. Application Data

[63] Continuation of Ser. No. 530,538, May 30, 1990, abandoned.

[30] Foreign Application Priority Data

Jun. 16, 1989 [JP] Japan .................................. 1-71056

[51] Int. Cl.$^5$ .............................................. F01L 1/14
[52] U.S. Cl. ..................... 29/888.03; 29/888.2; 29/888.43; 29/888.46; 29/469; 29/525; 74/569; 123/90.51
[58] Field of Search ............... 74/567, 568, 569, 559; 123/90.51, 90.48, 9.39; 384/907.1; 29/888.03, 888.09, 888.091, 888.2, 888.4, 888.41, 888.43, 888.46, 469, 525, 432

[56] References Cited

U.S. PATENT DOCUMENTS

| | | | |
|---|---|---|---|
| 1,470,410 | 10/1923 | Wilcox | 123/90.51 |
| 1,910,767 | 5/1933 | Hoern | 123/90.51 X |
| 2,840,063 | 6/1958 | Purchas, Jr. | 123/90.51 X |
| 2,932,290 | 4/1960 | Christensen | 29/888.03 |
| 2,963,011 | 12/1960 | Davis et al. | 123/90.51 |
| 3,073,292 | 1/1963 | Behnke et al. | 74/569 X |
| 3,131,470 | 12/1964 | Waller | 123/90.51 X |
| 3,470,983 | 10/1969 | Briggs | 123/90.51 X |
| 3,545,415 | 12/1970 | Mori | 74/569 X |
| 3,563,216 | 2/1971 | Vemura | 74/569 X |
| 3,941,102 | 3/1976 | Bareham | 74/569 X |
| 4,147,074 | 4/1979 | Noguchi et al. | 74/559 |
| 4,643,144 | 2/1987 | Fingerle et al. | 123/90.51 X |
| 4,728,216 | 3/1988 | Disborg | 29/525 |
| 4,768,476 | 9/1988 | Behnke et al. | 29/888.43 |
| 4,794,894 | 1/1989 | Gill | 74/579 R X |
| 4,850,095 | 7/1989 | Akao et al. | 74/569 X |
| 4,885,952 | 12/1989 | Connell | 74/569 |
| 4,886,392 | 12/1989 | Iio | 29/525 |
| 4,955,121 | 9/1990 | Sato et al. | 29/888.2 |

FOREIGN PATENT DOCUMENTS 3239325 4/1984 Fed. Rep. of Germany ... 123/90.51

*Primary Examiner*—Timothy V. Eley
*Assistant Examiner*—David P. Bryant
*Attorney, Agent, or Firm*—Sughrue, Mion, Zinn, Macpeak & Seas

[57] ABSTRACT

In a frictionally sliding structure, a metallic intermediate member is provided, which has a head and a stud. The stud is interfit into a recess provided with a tappet, while the head has a ceramic chip on which a cam is adapted to frictionally slide.

4 Claims, 4 Drawing Sheets

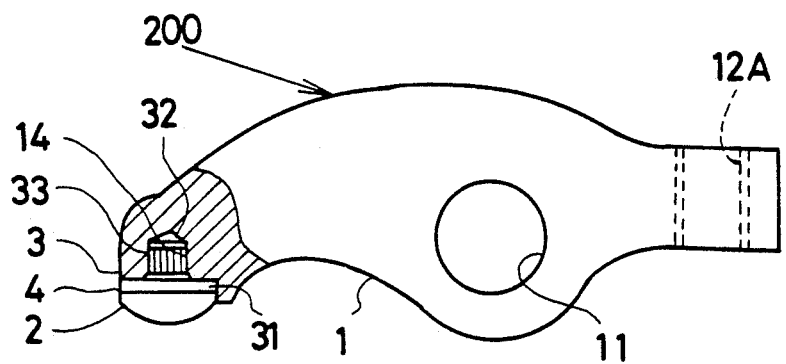
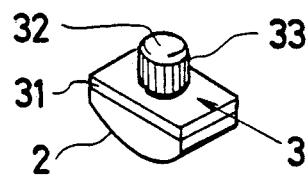
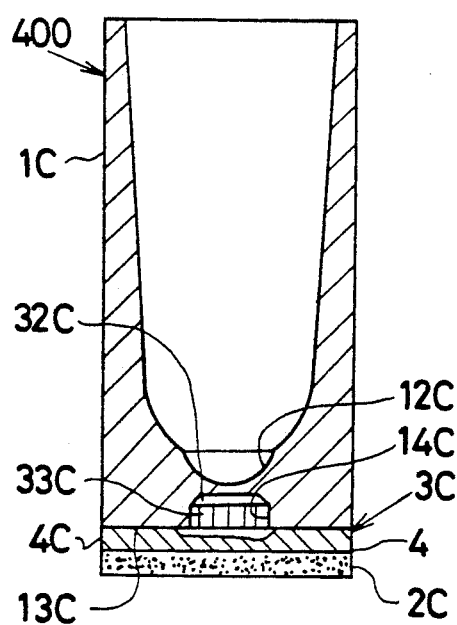
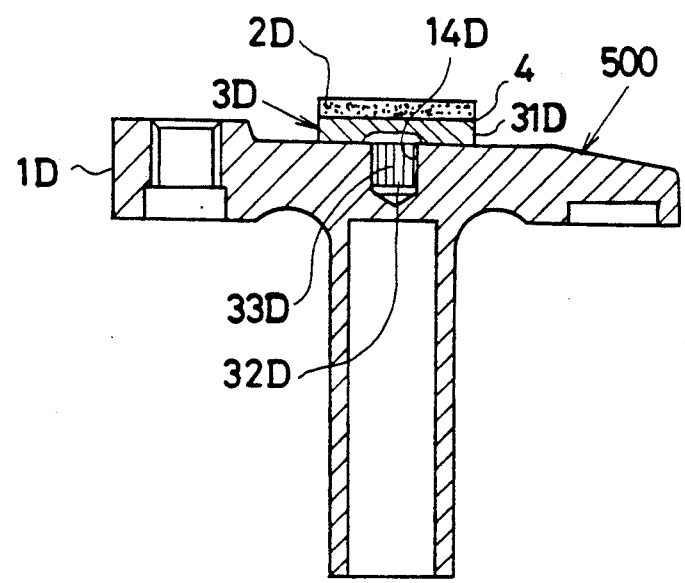

METHOD OF MAKING A FRICTIONALLY SLIDING COMPONENT

This is a continuation of application Ser. No. 07/530,538 filed May 30, 1990, now abandoned.

BACKGROUND OF THE INVENTION

1. Field of the Invention

This invention relates to a frictionally sliding structure well-suited for a rocker arm, push rod, tappet, and valve bridge, each of which constitutes a dynamic valve system in an internal combustion engine.

2. Description of Prior Art

In an internal combustion engine, friction-resistant properties have been demanded in a dynamic valve system in order to comply with an improved efficiency and an adoption of EGR (Exhaust Gas Recycling Device).

It has been suggested that a friction-resistant ceramic material would be applied to frictionally sliding members which constitutes the dynamic valve system in the internal combustion engine.

When making a rocker arm for example, a ceramic chip is discretely brazed merely to a sliding surface of the rocker arm on which a cam frictionally slides. However, it is feared that the rocker arm may be thermally deteriorated due to the fact that the rocker arm is annealed under the influence of the brazing procedure so as to lose its required strength. In order to avoid the thermal deterioration, it is necessary to apply a specific alloy to the rocker arm, thus making a manufacuturer disadvantageous in cost.

According to another suggestion, the ceramic chip is integrally embedded into the rocker arm simultaneously when the arm is cast. However, it is feared that the ceramic chip would fall off the rocker arm with the passage of time due to thermal expansional differences between the ceramic chip and the rocker arm.

Therefore, it is an object of the invention to eliminate all the above drawbacks, by providing a frictionally sliding structure which is capable of preventing a sliding member from being thermally deteriorated without using a specific alloy when a ceramic chip is secured to the sliding member by means of brazing.

SUMMARY OF THE INVENTION

According to the present invention, there is provided a frictionally sliding structure comprising; the first and second sliding member being each made of metallic material; a recess provided with the sliding surface of the first sliding member; an intermediate member having a metallic head and a stud integrally fixed to the head, the intermediate member being securely fixed to the sliding surface of the first sliding member by interfitting the stud into the recess; a friction resistant ceramic chip securely bonded to the head of the intermediate member by means of brazing, so that the ceramic chip frictionally slides on the sliding surface of the second sliding member.

The ceramic chip is previously brazed to the head of the intermediate member, so that the sliding member is prevented from being exposed to a high intensity of heat at the time of brazing. Without applying a specific alloy to the sliding member, the sliding member is substantially free from thermal deterioration which would otherwise be caused by annealing. This arrangement makes it possible to manufacture the sliding member with a lightweight aluminum, thus decreasing an inertia mass so as to cope with high rpm of an internal combustion engine.

At the time of securing the intermediate member to the sliding member, it is only needed to interfit the stud into the recess with ease. In association with interfitting the stud into the recess, one side of the head comes to engage with the stepped bank so as to place the intermediate member in position, and block the member against any rotational play. With the engagement of the head against the stepped bank, a shearing force applied to the stud when the second sliding member slides on the first sliding member, is partly shared by the stepped bank.

Further, a thermal expansion of the stud is determined to be the same or somewhat higher than that of the sliding member, thus preventing the intermediate member from inadvertently falling off the recess of the sliding member during operation.

Other object and advantages to be obtained by the present invention will be apparent from the following description and in the accompanying drawings.

BRIEF DESCRIPTION OF THE DRAWINGS

FIG. 5 is a plan view of a rocker arm which constitutes the dynamic valve system according to a second embodiment of the invention, but partly sectioned;

FIG. 6 is a perspective view of an intermediate member according to a second embodiment of the invention;

FIG. 8 is an enlarged longitudinal cross sectional view of a tappet which constitutes the dynamic valve system according to a fourth embodiment of the invention; and FIG. 9 is an enlarged longitudinal cross sectional view of a valve bridge which constitutes the dynamic valve system according to a fifth embodiment of the invention.

DETAILED DESCRIPTION OF THE PREFERRED EMBODIMENTS

Figure 1:
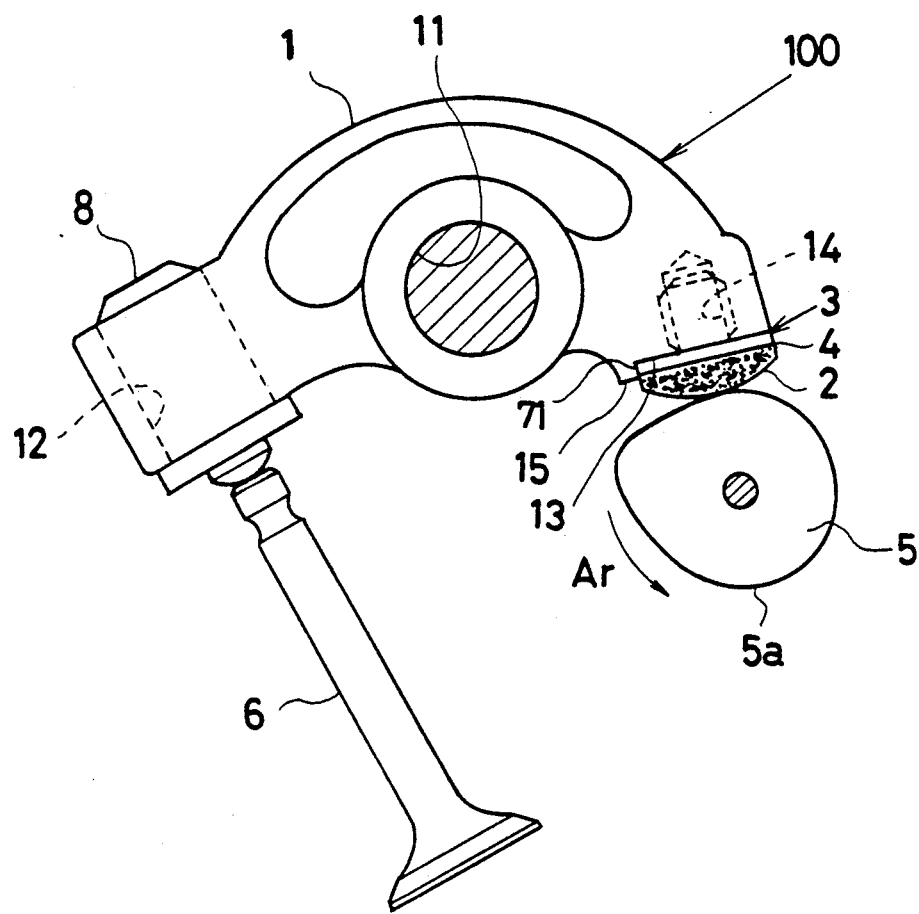
FIG. 1 is a plan view of a rocker arm according to a first embodiment of the invention.
Figure 2:
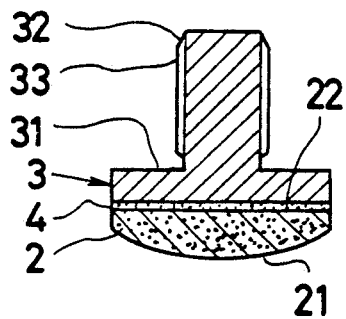
FIG. 2 is a longitudinal cross sectional view of an intermediate member.
Figure 3:
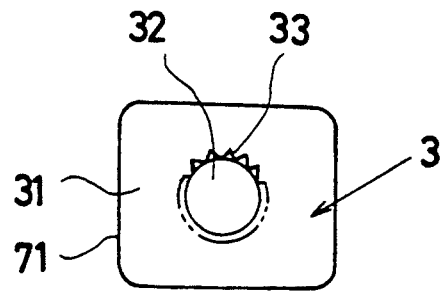
FIG. 3 is a plan view of the intermediate member.

Referring to FIGS. 1 through 3 in which a rocker arm 100 works as a first sliding member, while a cam 5 works as a second sliding member, a first embodiment of the invention is described. The rocker arm 100 constitutes a Over Head Valve (OHV) type dynamic valve system, and is adapted to transform a movement of the cam 5 into that of a valve 6. The rocker arm 100 comprises a main body 1 made of aluminum, a friction-resistant ceramic chip 2, and an intermediate member 3 which integrally secures the ceramic chip 2 to the main body 1. The ceramic chip 2 is made of silicon nitride ($Si_3N_4$) as a main component, while the intermediate member is made of a metallic material, thermal expansion of which is the same or somewhat higher than that of the main body 1. The rocker arm 100 is rockably supported at an axial bore 11 provided with a central portion of the main body 1. One end surface 13 of the rocker arm 100 is adapted to frictionally slide on a sliding surface 5a of the cam 5 by way of the ceramic chip 2, while the other end surface the rocker arm 100 is spring urged to engage with a valve 6 by means of a push adjuster 8 which is interfit into a hole 12 provided with the main body 1. The ceramic chip 2 is in the form of rectangle, and having a flat plane 22 at one surface, and a convex curve 21 at another surface which is adapted to engage with the sliding surface 5a of the cam 5. With the end surface 13 of the rocker arm 100, a recess 14, and a stepped bank 15 are provided. The stepped bank 15 is located in the neighborhood of the recess 14, and is perpendicularly aligned with the cam 5.

The intermediate member 3 has a rectangular head 31 and a stud 32 integrally secured to the head 31 to form a T-shaped configuration as a whole. Roulette 33 is provided with an outer surface of the stud 32 to securely fix the stud 32 when the stud 32 is interfit in the recess 14 as mentioned hereinafter.

In this instance, the flat plane 22 of the ceramic chip 2 is securely fixed to an outer surface of the head 31 by means of silver-based brazing 4. Then the intermediate member 3 is secured to the main body 1 by interfitting the stud 32 into the recess 14.

During installation one side 71 of the head 31 is brought into tight engagement with the stepped bank 15 so as to be placed in position, and blocked against an inadvertent rotational play.

With a rotary movement of the the cam 5 as seen at arrow Ar in FIG. 1, the surface 5a of the cam 5 frictionally slides on the convex surface 21 of the rocker arm 100 to displace the rocker arm 100 so as to actuate the valve 6.

In this instance, the stud 32 is subjected to shearing force from the head 31, the shearing force, however, is shared by the stepped bank 15 to reduce the burden applied to the stud 32 since the head 31 engages with the stepped bank 15. The rocker arm 100 and the ceramic chip 2 are manufactured as follows:

The ceramic chip 2 is made from 90 wt % silicon nirtide ($Si_3N_4$) with addition of 10 wt % auxiliary agent which are compacted together by means of mould pressing, and sintered under an atmosphere of nitrogen. The chip 2 measures 15 mm in length, 18 mm in width and 13 mm in thickness. The flat plane 22 of the chip 2 is abrasively treated to form a brazing surface to mate with the head 31.

In the meanwhile, the intermediate member 3 is made from JIS SNCM 630 forged to form the head 31 which measures 15 mm in length, 18 mm in width and 2 mm in thickness. The stud 32 measures 7 mm in diameter, and 10 mm in height.

In-Cu-Ag-Ti based brazing 4 is employed, and the chip 2 is brazed to the head 31 under vacuum at 790 degrees Celsius for 15 minutes. The stud 32 is interfit into the recess 14 by an allowance of 60 microns.

An endurance experiment was carried out with the rocker arm 100 incorporated into a four-cylinder engine. The engine was operated at 6000 rpm for 200 hours.

As a result of this experiment, no faults were found.

Figure 4:
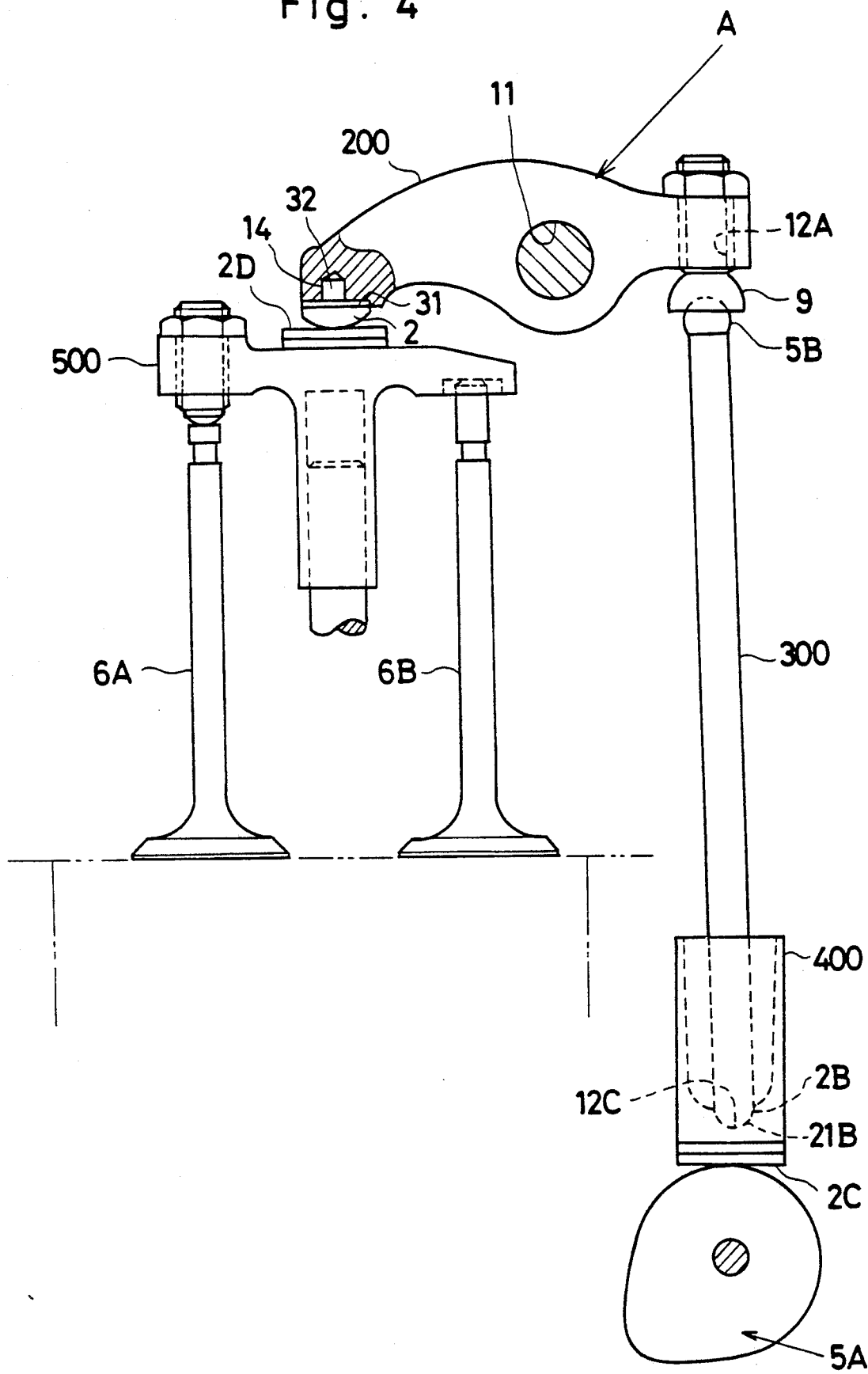
FIG. 4 is a schematic view of a dynamic valve system in an Over Head Valve (OHV) type diesel engine.

Referring to FIGS. 4 though 6, a second embodiment of the invention is described. FIG. 4 shows an OHV type dynamic valve system (A) which is constituted by sliding members such as rocker arm, push rod, tappet and valve bridge. In the second embodiment of the invention, like reference numerals in FIGS. 1 through 3 are identical to those in FIGS. 4 through 6.

A rocker arm 200 comprises the aluminum main body 1, the ceramic chip 2, and the intermediate member 3 which secures the ceramic chip 2 to the main body 1. To an outer surface of the head 31, the ceramic chip 2 is brazed in the same manner as described as the first embodiment. The intermediate member 3 is secured to the rocker arm 200 by the stud 32 into the recess 14. The rocker arm 200 is rockably supported by the axial bore 11. One end of the rocker arm 200 engages with a ceramic plate 2D of a valve bridge 500, and other end of the rocker arm 200 is connected a push rod 300 by means of a ball-and-socket joint (5B, 9) which is attached through a hole 12A provided with the rocker arm 200.

Figure 7:
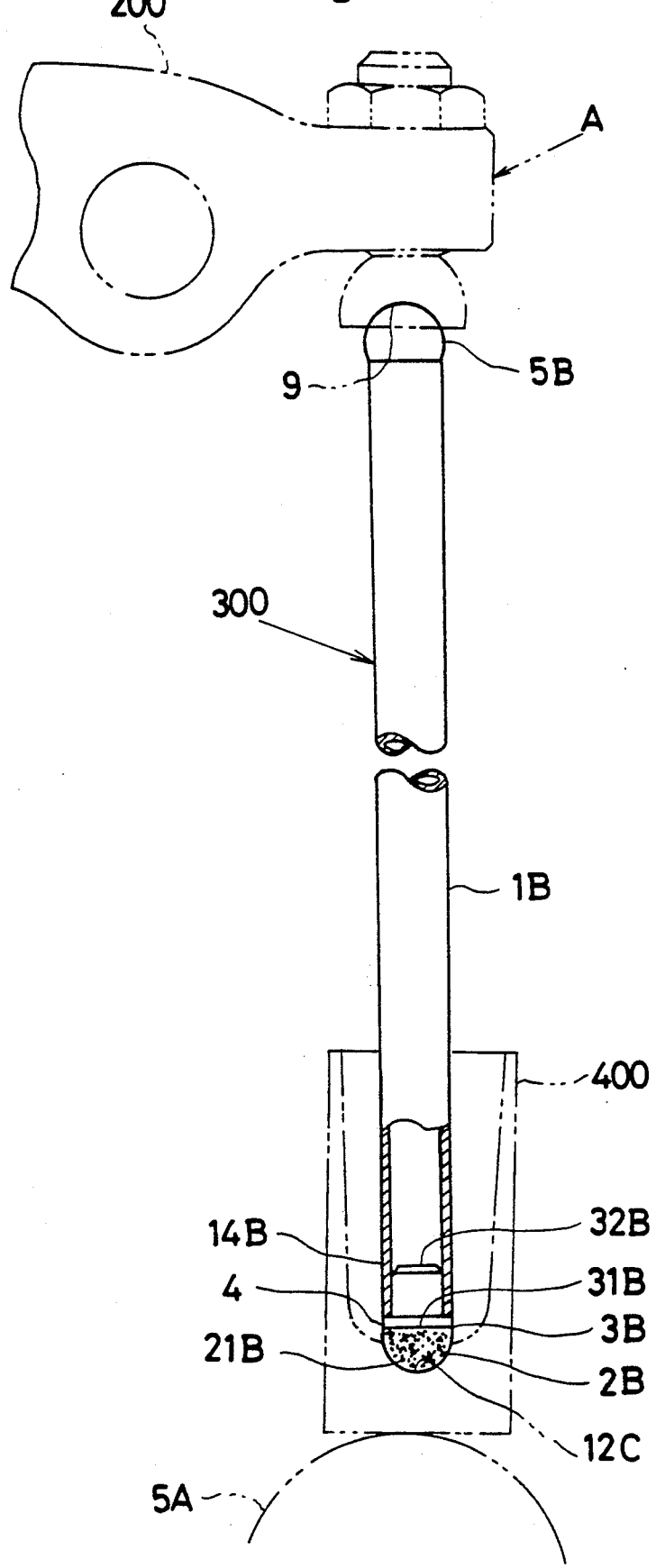
FIG. 7 is a plan view of a push rod which constitutes the dynamic valve system according to a third embodiment of the invention, but a main part is longitudinally sectioned.

Referring to FIG. 7 in which the push rod 300 is incorporated into the dynamic valve system (A), a third embodiment of the invention is described. The push rod 300 comprises an elongated tubular body 1B made of STKM based steel, and a semi-spherical ceramic chip 2B made of silicon nitride. An intermediate member 3B is made from SNCM 616 based steel to secure the ceramic chip 2B to the push rod 300. The ceramic chip 2B which has a sliding surface 21B at the semi-spherical head, is securely fixed to a head 31B of the intermediate member 3B by means of brazing 4. Then, a stud 32B of the intermediate member 3B is press fit into a recess 14B of the tubular body 1B. The semi-spherical head of the ceramic chip 2B is movably received by a semi-spherical concave 12C provided at an inner bottom of a cup-shaped tappet 400. It is noted that the ball 5B of the ball-and socket joint (5B, 9) may be made of silicon nitride, and interfit into the tubular body 1B by means of the intermediate member 3B.

Referring to FIG. 8 in which the tappet 400 constitutes the dynamic valve system, a fouth embodiment of the invention is described. The cup-shaped tappet 400 has a main body 1C made from SCM 415-based steel. An outer surface of the main body 1C is thermally hardened by carburizing. An outer bottom of the main body 1C serves as a sliding surface 13C to which a ceramic chip 2C is secured by way of an intermediate member 3C which is made of SNCM 439 based steel. A recess 14C is provided with the outer bottom of the tappet 400 in registration with the semi-spherical concave 12C. The ceramic chip 2C is fixed to a head 4C of the intermediate member 3C by means of the brazing 4 so as to frictionally slide on a cam surface of a cam 5A as shown in FIG. 1. A stud 32C of the intermediate member 3C which has a roulette 33C at its outer surface, is interfit into the recess 14C by means of shrinkage fit.

Referring to FIG. 9 in which the valve bridge 500 is shown to constitute the dynamic valve system (A), a fifth embodiment of the invention is described. The valve bridge 500 has a T-shaped main body 1D made of cast iron, a ceramic chip 2D, and an intermediate member 3D which secures the ceramic chip 2D to the main body 1D. The ceramic chip 2D is fixed to a head 31D of the intermediate member 3D by means of brazing 4. A stud 32D of the intermediate member 3D is press fit into a recess 14D provided with an upper surface of the main body 1D by means of a roulette 33D. The main body 1D of the valve bridge 500 is movably supported by valves 6A, 6B at both ends with the ceramic chip 2D engaged against the ceramic chip 2 of the rocker arm 200 as shown in FIG. 4.

An endurance experiment was carried out with the dynamic valve system of FIG. 4 incorporated into six-cylinder, 12000 cc diesel engine. The engine was operated at 2000 rpm for 200 hours. In this instance, a spring constant of a valve spring was determined to be 1.5 times as the great as usual one. After the experiment, the dynamic valve system (A) was taken out to check the sliding members as designated by numerals 200, 300, 400 and 500. No cracks were found on any ceramic chip.

Among the ceramic chips, an amount of wear was at most 3 microns.

On the other hand, the same experiment was carried out when a chip for a rocker arm was made of sintered metal, a chip for a valve bridge was made of super hard metal, a chip for push rod was made of quenched steel, and a chip for a a tappet hardnable cast iron. After 40 hours of the experiment, violent vibration and noise came out. The dynamic valve system was checked to find that the valve clearance was abnormally increased. Scuffs were found on cam surfaces of cams with an amount of wear reaching to 120 microns. The amount of wear on a sliding surface of the push rod was 60 microns. The amount of wear on chips of the rocker arm and the valve bridge were in turn 30 microns and 15 microns.

As understood from the comparison, the sliding members according to the invention have an improved friction resistant property, and can cope with high rpm of the internal combustion engine for a long service life.

Although various modifications might be suggested by those versed in the art, it should be understood that we wish to embody within the scope of the patent hereon all such modifications as resonably and properly come within the scope of our contribution to the art.

What is claimed is:

1. A method of making a frictionally sliding component, said component being made of lightweight aluminum and having a recess provided therein, said method comprising the steps of:

preparing an intermediate member which has a steel-based metallic head and a stud integrally fixed to the head;

bonding a friction-resistant ceramic chip securely to the head of the intermediate member by means of brazing so as to form a complete intermediate member; and fixing the complete intermediate member securely to said component by interfitting the stud within the recess in said component.

2. The method as recited in claim 1, further comprising providing roulettes on an outer surface of the stud of the intermediate member so as to strengthen the interfit of the stud against the recess.

3. The method as recited in claim 1, wherein the ceramic chip is made of silicon nitride as a main component.

4. The method as recited in claim 1, wherein the thermal expansion of the stud is not less than that of said component.

* * * * *